United States Patent [19]

Ullrich

[11] 4,158,039

[45] Jun. 12, 1979

[54] PRESSURE VESSEL FOR SEPARATING SULFUR FROM AN AQUEOUS SULFUR SUSPENSION

[75] Inventor: Hansjürgen Ullrich, Bochum, Fed. Rep. of Germany

[73] Assignee: Dr. C. Otto & Comp. G.m.b.H., Bochum, Fed. Rep. of Germany

[21] Appl. No.: 817,655

[22] Filed: Jul. 21, 1977

[30] Foreign Application Priority Data

Aug. 10, 1976 [DE] Fed. Rep. of Germany ....... 2635862

[51] Int. Cl.² ............................................. C01B 17/08
[52] U.S. Cl. .................................. 422/262; 23/308 S; 422/252; 422/284
[58] Field of Search .................. 23/308 S, 308, 273 R, 23/280; 159/26 R, 28 C; 423/578 R, 578 A; 422/262, 252, 284

[56] References Cited

U.S. PATENT DOCUMENTS

| 1,408,467 | 3/1922 | Perry | 23/308 |
|---|---|---|---|
| 1,508,355 | 9/1924 | Thornton | 23/308 S |
| 1,990,602 | 2/1935 | Guernsey | 23/280 |
| 2,149,373 | 3/1939 | Vincent | 23/308 S |
| 2,253,566 | 8/1941 | Klepetko | 23/308 S |
| 2,731,332 | 1/1956 | Ackert | 23/308 S |
| 3,072,463 | 1/1963 | Owens | 23/308 S |
| 3,306,446 | 2/1967 | Lewis | 23/308 S |
| 3,607,143 | 9/1971 | Wierman | 23/308 S |
| 3,689,226 | 9/1972 | Stoddard | 23/308 S |
| 3,689,229 | 9/1972 | Lane | 23/280 |

OTHER PUBLICATIONS

Saeman, "Design", Industrial and Engineering Chemistry, vol. 53, No. 8, Aug. 1961, pp. 612–622.

*Primary Examiner*—Stephen J. Emery
*Attorney, Agent, or Firm*—Thomas H. Murray

[57] ABSTRACT

Apparatus for continuously separating sulfur from an aqueous sulfur suspension which is heated above the melting point of sulfur. The apparatus comprises a pressure vessel having heating and stirring means in its upper part, the lower part of the vessel serving as a settling tank where sulfur is precipitated out of the aqueous solution and withdrawn through an outlet in the bottom of the vessel. Intermediate the upper and lower parts of the vessel is a substantially horizontal, shallow conical partition which has apertures or slots therein to permit the suspension to pass from the upper part to the lower part. A steam-heated jacket surrounds the vessel; while pressure sensing devices are utilized to maintain the level of the water in the top part and the boundary surface between the water phase and the sulfur phase in the bottom part at desired heights. The pressure sensing devices also control the withdrawal of sludge at the interface between the water phase and sulfur phase as a function of the differential pressure above and below the interface.

10 Claims, 1 Drawing Figure

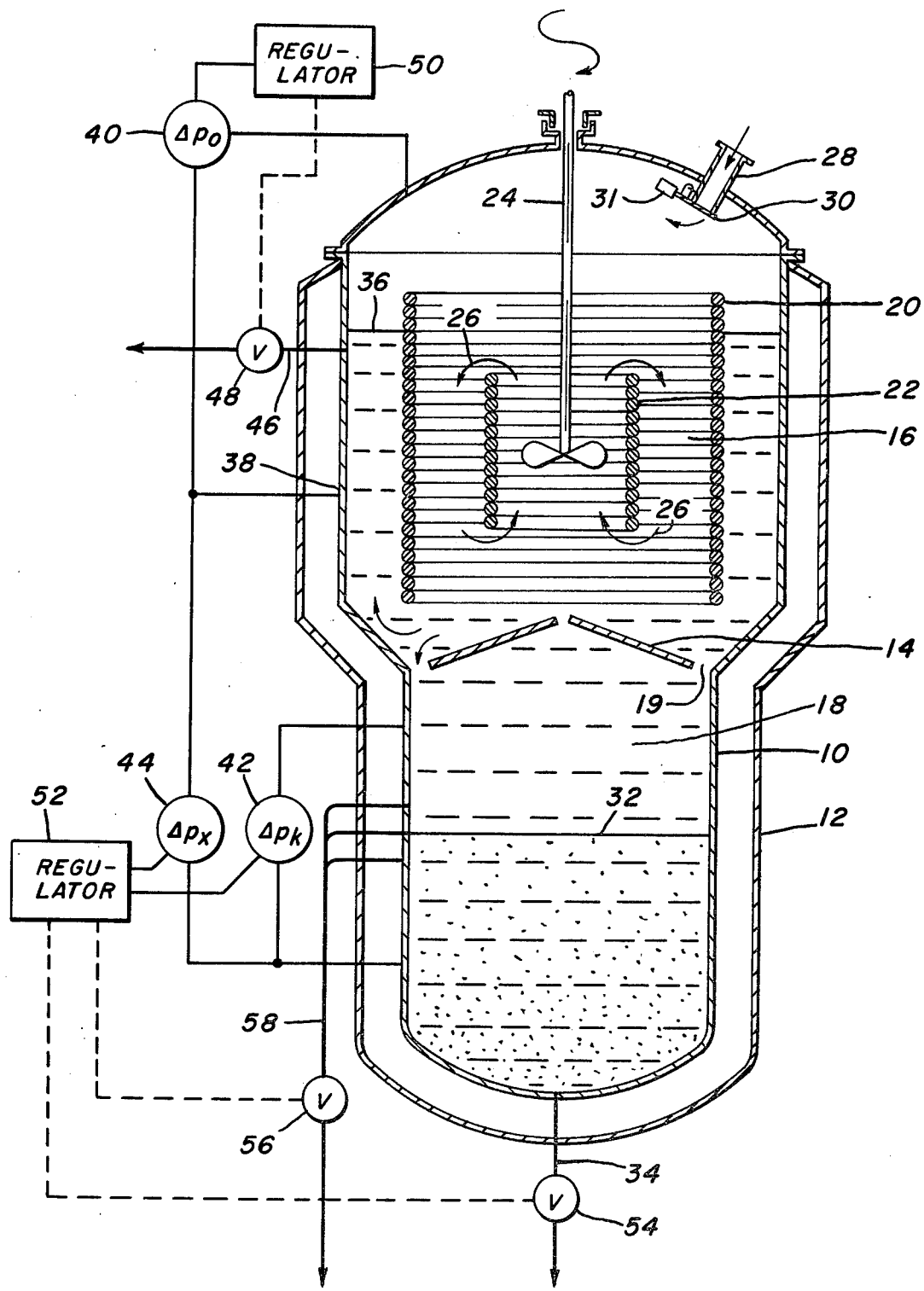

PRESSURE VESSEL FOR SEPARATING SULFUR FROM AN AQUEOUS SULFUR SUSPENSION

BACKGROUND OF THE INVENTION

In various methods for desulfurizing industrial gases, for example, the extracted sulfur is finely dispersed in an aqueous suspension and forms a sulfur paste. Elemental sulfur can be obtained from the paste by drying it; however much more energy can be saved, and greater economies practiced, by heating the paste until the sulfur melts, after which the water and sulfur phases are separated in a settling device as a result of their different densities. In order to prevent the water in the paste from evaporating when the sulfur melts (at approximately 113° C.), the melting process must occur at a pressure of 2 to 5 bars in an autoclave. Sulfur-melting autoclaves of this type have been used in the past, but are limited to batch operations, meaning that the individual steps (i.e., pouring in, melting, phase separation and emptying) occur in succession rather than on a continuous basis.

SUMMARY OF THE INVENTION

The present invention is concerned with a pressure vessel for continuously separating sulfur from an aqueous sulfur suspension in a flow-through process. In order to meet practical operating conditions, the operating temperature should be between 120° C. and 150° C. and the pressure should be between 2 and 5 bars. At the upper temperature limit, there is no increase in the viscosity of liquid sulfur, such as occurs at higher temperatures as a result of molecular processes.

According to the invention, the pressure vessel for continuously separating sulfur from an aqueous suspension is divided into an upper part containing a heating and stirring device and a lower part which serves as a settling tank and has a sulfur outlet at its bottom. Intermediate the upper and lower parts is a horizontal, shallow conical partition having apertures or slots therein. Desirably, the upper part and the lower part are surrounded by a steam-heated jacket.

In the preferred embodiment of the invention, the annular wall of the upper part tapers downwardly in a conical configuration, the partition having apertures or slots therein being disposed at the lower end of the tapered portion. Heating devices, preferably heating coils, are disposed in the top portion; and a heated fluid flows through them. The heating coils are in the form of vertical cylinders, one within the other, and thus divide the top portion of the pressure vessel into annular chambers. The stirring device in the upper portion can be a centrally-disposed, upwardly conveying propeller. The heating coils in the form of vertical cylinders are disposed around the propeller such that when the propeller is in operation, the contents of the pressure vessel circulate around the heating coils. One of the heating coils, in the form of a cylindrical wall, forms an annular chamber with the outer wall of the upper portion of the pressure vessel. This annular chamber is open at the top and bottom and communicates with an outlet of water separated in the annular chamber.

Devices are provided for measuring the differential pressure between the surface of the water in the upper portion of the pressure vessel and the boundary surface between the water phase and the sulfur phase in the lower part. Regulating devices regulate the withdrawal of water and sulfur in dependence on the pressure at the water surface in the upper portion and the differential pressure at the boundary surface between the water phase and the sulfur phase in the lower portion. Sludge can be removed through conduits placed near the boundary surface between the water phase and the sulfur phase.

The above and other objects and features of the invention will become apparent from the following detailed description taken in connection with the accompanying single FIGURE drawing which forms a part of this specification.

With reference now to the drawing, the pressure vessel shown is provided with an inner wall 10 surrounded by an outer wall 12 forming a jacket which may be heated by steam. A shallow conical partition 14 divides the vessel into an upper portion 16 and a lower portion 18. The conical partition 14 has a radius less than the inner wall of the lower portion 18. As a consequence, an annular opening or slit 19 is left between the outer periphery of the partition 14 and the inner wall of the lower portion of the pressure vessel.

Two groups 20 and 22 of heating coils are disposed in the upper portion 16 and form vertical cylinders, thus dividing the upper portion 16 into individual annular chambers. A stirring device comprising a propeller 24 is disposed within the inner coil 22 and drives the liquid in the vessel in a circular pattern as shown by the arrows 26.

Sulfur paste is introduced into the pressure vessel through a nozzle 28 fitted with a gravity valve 30 which will open under the weight of the sulfur paste but will thereafter close due to the weight of a counterweight 31. After the sulfur paste is poured into the pressure vessel, it gradually heats up and the suspended sulfur melts. The molten sulfur then collects in drops which, owing to their greater weight, sink downwardly and flow into the lower portion or settling chamber 18 through the annular space 19 between the inner wall of the pressure vessel and the partition 14.

In the lower settling chamber 18, the fluid is substantially stagnant with the result that phase separation proceeds undisturbed as a result of gravity; and a boundary surface 32 forms between the sulfur phase, at the bottom, and water above it. The height of the surface 32 can be kept constant by continuously or intermittently withdrawing molten sulfur through an outlet 34 at the bottom of the pressure vessel.

A pressure sensing device 40 is provided for measuring the differential pressure $\Delta p_o$ between the gas and water phase in the upper portion 16. That is, the difference in pressure between the air above the level 36 of the paste suspension and the hydrostatic pressure at point 38 is measured by the pressure sensing device 40. Similarly, the pressure differential $\Delta p_k$ between the water phase above the boundary surface 32 and the sulfur phase beneath is measured by a pressure sensing device 42. Finally, the difference in pressure $\Delta p_x$ between point 38 and the sulfur phase beneath the boundary surface 32 is measured by pressure sensing device 44.

It will be noted that slightly below the level 36 in the upper portion 16 is a conduit 46 containing a control valve 48 which is, in turn, controlled by a regulator 50 connected to the differential pressure sensing device 40. The arrangement is such that as the level 36 rises to a predetermined height, the pressure differential sensed by sensing device 40 will rise to the point where the regulator 50 opens the valve 48 to permit excess water, from which sulfur has been separated, to drain off. The differential pressure sensing devices 42 and 44 are connected to a regulator 52 which, in turn, controls valves 54 and 56. The valve 54 controls the discharge of sulfur through conduit 34. As a function of the pressure differential $\Delta p_x$, this differential being an indication of the height of the sulfur phase beneath surface 32. The valve 56, on the other hand, controls the discharge of sludge forming at the boundary surface 32 through conduit 58. In this respect, the two differential pressures $\Delta p_x$ and $\Delta p_k$ can, by calibration, each be associated with given heights of the phase boundary surface 32. During normal operations, the measurements for $\Delta p_x$ and $\Delta p_k$, derived by calibration, will give the same values for the proper height of the phase boundary surface 32. However, if the differential pressure values measured by devices 42 and 44 should become different, the difference indicates that a layer having a different density (usually dirt and sludge) has formed in the neighborhood of the boundary surface 32. If this should occur (i.e., a difference in the differential pressure measurements sensed by devices 40 and 42), the valve 56 is opened to withdraw the sludge through conduit 58.

The pressure vessel of the invention operates at a pressure between 2 and 5 bars, with a water temperature of 120° C. to 150° C. Preferably, the coils 20 and 22 and the surrounding steam jacket are heated by saturated steam at a temperature between 125° C. and 155° C. The outer steam jacket also prevents the vessel walls from cooling unacceptably to the point where the sulfur solidifies thereon and forms a layer.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for continuously separating sulfur from an aqueous sulfur suspension which is heated above the melting point of sulfur, comprising a pressure vessel having heating and stirring means in its upper portion, said heating and stirring means comprising annular coaxial heating coils extending along said upper portion and propeller means coaxially disposed within the annular space surrounded by the heating coils for causing the contents of said upper portion to circulate around said heating coils, the lower portion of the vessel serving as a settling tank and having an outlet for separated sulfur at its bottom, means to introduce an aqueous sulfur suspension into the upper portion of the vessel, and a substantially horizontal, shallow conical partition located between the upper and lower portions and beneath said heating and stirring means, the side wall of the vessel defining with said partition at least one opening to pass therethrough an aqueous sulfur suspension from the upper portion into the lower portion of the vessel.

2. The apparatus of claim 1 wherein said opening comprises an annular space between the outer periphery of said partition and the inner wall of said vessel.

3. The apparatus of claim 1 including a steam jacket surrounding the upper and lower portions of said pressure vessel.

4. The apparatus of claim 1 wherein the lower end of the wall of the upper portion of said pressure vessel tapers conically downwardly; and said partition is disposed at the bottom end of the tapered portion.

5. The apparatus of claim 1 wherein said propeller means comprises an upwardly-conveying propeller centrally disposed within said coaxial, annular heating coils.

6. The apparatus of claim 5 wherein said annular heating coils form, with the inner wall of said upper portion, annular, vertically-extending chambers through which the contents of the pressure vessel circulate.

7. The apparatus of claim 1 including means for measuring the difference in pressure between the air above said sulfur suspension in the upper portion of said pressure vessel and a point beneath the level of said suspension in the upper portion, and means for draining liquid from said upper portion when the difference in pressure thus measured indicates that the level has risen above a predetermined height.

8. The apparatus of claim 1 wherein the sulfur separating from the aqueous suspension in said lower portion of the pressure vessel forms a phase boundary between a sulfur phase at the bottom and a water phase above, and including first means for measuring the difference in pressure between points in the sulfur and water phases in said lower portion, second means for measuring the difference in pressure between a point in the sulfur phase and a point in the aqueous suspension in said upper portion of the pressure vessel, and regulating means responsive to the difference in pressures thus measured for withdrawing sludge from the region of said phase boundary when the difference in pressures thus measured indicates that there has been a change in density in the region of said phase boundary.

9. The apparatus of claim 1 wherein the sulfur separating from the aqueous suspension in said lower portion of the pressure vessel forms a phase boundary between a sulfur phase at the bottom and a water phase above, and including means for measuring the difference in pressure between a point in the sulfur phase and a point in the aqueous suspension in said upper portion of the pressure vessel, and means for withdrawing sulfur from the bottom of said pressure vessel in dependence upon the difference in pressures thus measured, said difference being an indication of the height of the sulfur phase in said lower portion of the pressure vessel.

10. Apparatus for continuously separating sulfur from an aqueous sulfur suspension which is heated above the melting point of sulfur, comprising a pressure vessel having upper and lower portions surrounded by a steam jacket, means to introduce an aqueous sulfur suspension into the upper portion of the vessel, the lower end of the wall of the upper portion tapering conically downwardly to its connection to said lower portion, coaxial annular heating coils extending along the upper portion of said pressure vessel, upwardly conveying propeller means centrally disposed within said coaxial annular heating coils to cause the contents of the pressure vessel within the upper portion thereof to circulate around said heating coils, the lower portion of the vessel serving as a settling tank and having an outlet for separated sulfur at its bottom, a substantially horizontal conical partition between the upper and lower portions, an annular space between the outer periphery of said partition and the inner wall of said vessel, said annular space forming an opening through which an aqueous sulfur suspension can pass from the upper portion to the lower portion of said vessel, means for measuring the difference in pressure between the air above said sulfur suspension in the upper portion of said pressure vessel and a point beneath the level of said suspension in the upper portion, means for draining liquid from said upper portion when the difference in pressure thus measured indicates that the level has risen above a predetermined height, the sulfur separating from the aqueous suspension in said lower portion of the pressure vessel forming a phase boundary between a sulfur phase at the bottom and water phase above, first means for measuring the difference in pressure between points in the sulfur and water phases in said lower portion, second means for measuring the difference in pressure between a point in the sulfur phase and a point in the aqueous suspension in said upper portion of the pressure vessel, regulating means responsive to the difference in pressures thus measured by said first and second measuring means for withdrawing sludge from the region of said phase boundary when the difference in pressures thus measured indicates that there has been a change in density in the region of said phase boundary, and means for withdrawing sulfur from the bottom of said pressure vessel in dependence upon the difference in pressures thus measured by said second measuring means, said difference being an indication of the height of the sulfur phase in said lower portion of the pressure vessel.

* * * * *